United States Patent
Xie et al.

(10) Patent No.: US 12,526,111 B2
(45) Date of Patent: Jan. 13, 2026

(54) SIGNAL PROCESSING METHOD AND APPARATUS

(71) Applicant: HUAWEI TECHNOLOGIES CO., LTD., Shenzhen (CN)

(72) Inventors: Xinqian Xie, Beijing (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 405 days.

(21) Appl. No.: 18/175,078

(22) Filed: Feb. 27, 2023

(65) Prior Publication Data

US 2023/0208595 A1 Jun. 29, 2023

Related U.S. Application Data

(63) Continuation of application No. PCT/CN2020/112460, filed on Aug. 31, 2020.

(51) Int. Cl.
*H04L 5/00* (2006.01)
*H04W 72/23* (2023.01)
*H04W 72/232* (2023.01)

(52) U.S. Cl.
CPC ......... *H04L 5/0051* (2013.01); *H04W 72/232* (2023.01)

(58) Field of Classification Search
CPC ..................... H04L 5/0051; H04W 72/232
See application file for complete search history.

(56) References Cited

U.S. PATENT DOCUMENTS

| | | | |
|---|---|---|---|
| 2019/0007181 A1 | 1/2019 | Marinier et al. | |
| 2019/0116007 A1* | 4/2019 | Yi | H04W 72/0453 |
| 2019/0334688 A1 | 10/2019 | Kwak et al. | |
| 2020/0195409 A1 | 6/2020 | Kwak et al. | |

(Continued)

FOREIGN PATENT DOCUMENTS

| | | |
|---|---|---|
| CN | 108476110 A | 8/2018 |
| CN | 111133716 A | 5/2020 |

OTHER PUBLICATIONS

Qualcomm Incorporated: "Support of longer numerologies for rooftop reception", 3GPP Draft; R1-1913247, Nov. 16, 2019, XP051825969, total 14 pages.

(Continued)

*Primary Examiner* — Ronald B Abelson
(74) *Attorney, Agent, or Firm* — HAUPTMAN HAM, LLP

(57) ABSTRACT

Embodiments of this application disclose a signal processing method and an apparatus, which may be applied to a wireless communication system, for example, a new radio NR system. The method includes: A terminal device receives first indication information from a network device, where the first indication information indicates whether a first reference signal in a first time period is associated with a second signal in a second time period, the first reference signal is associated with a first signal in the first time period, and a start moment of the second time period is after an end moment of the first time period. The terminal device processes the second signal based on the first indication information. This facilitates subsequent processing of the second signal and helps the terminal device determine whether to store the first reference signal.

18 Claims, 6 Drawing Sheets

(56) References Cited

U.S. PATENT DOCUMENTS

2021/0218515 A1\* 7/2021 Yi ........................ H04W 72/21

OTHER PUBLICATIONS

Huawei et al: "On UL DMRS indication for 2/3-symbol sPUSCH", 3GPP Draft; R1-1706985, May 14, 2017, XP051272215, total 6 pages.
Qualcomm Incorporated: "URLLC DL pre-emption and UL suspension indication channel design", 3GPP Draft; R1-1720692,Nov. 18, 2017, XP051370153,total 10 pages.
Partial Supplementary European Search Report issued in corresponding European Application No. 20950860.5, dated Sep. 4, 2023, pp. 1-19.

\* cited by examiner

SIGNAL PROCESSING METHOD AND APPARATUS

CROSS-REFERENCE TO RELATED APPLICATIONS

This application is a continuation of International Application No. PCT/CN2020/112460, filed on Aug. 31, 2020, the disclosure of which is hereby incorporated by reference in its entirety.

BACKGROUND

In a 5G new radio (new radio, NR) system and a long term evolution (long term evolution, LTE) system, an orthogonal frequency division multiple access (orthogonal frequency division multiple access, OFDMA) manner is usually used as a multiple access manner. Main features of the orthogonal frequency division multiple access manner are as follows: Transmission resources are divided into mutually orthogonal time-frequency resource elements (resource elements, REs), and signals sent by a transmitting end are all carried on REs and transmitted to a receiving end. Because different REs are mutually orthogonal, the receiving end separately receives a signal sent on each RE. In consideration of a fading feature of a wireless channel, a signal carried on an RE is distorted after being transmitted through the channel. Usually, a channel distortion is referred to as a channel coefficient. To recover the signal at the receiving end, the channel coefficient is estimated. Usually, a reference signal-based solution is used. To be specific, the transmitting end transmits a known signal on a specific RE, and the receiving end estimates a channel coefficient based on a received signal and the known signal, and performs interpolation on a channel coefficient on another RE based on the channel coefficient obtained through estimation. This facilitates receiving and demodulation of a data signal based on the channel coefficient obtained through estimation.

Currently, 5G NR supports a fixed access node, and a channel of the access node changes slowly with time. Therefore, channels of adjacent slots in terms of time is considered to be approximately equal, and for a subsequent slot, a channel estimated based on a demodulation reference signal (demodulation reference signal, DMRS) in a previous slot is used for data demodulation. The transmitting end uses downlink control information (downlink control information, DCI) to carry indication information indicating whether a current slot carries a DMRS, to flexibly configure a DMRS based on a requirement, and reduce DMRS overheads.

However, regardless of whether there is a DMRS in a subsequent slot, in response to there being a DMRS in the current slot, the receiving end buffers the DMRS in the current slot, to avoid using the DMRS in the current slot for the subsequent slot.

SUMMARY

Embodiments described herein provide a signal processing method and an apparatus, to reduce buffer overheads of an end device.

According to a first aspect in at least one embodiment, a signal processing method is provided. The method is performed by a terminal device, or is performed by a component (for example, a processor, a chip, or a chip system) of the terminal device. The method includes: The terminal device receives first indication information from a network device, where the first indication information indicates whether a first reference signal in a first time period is associated with a second signal in a second time period, the first reference signal is associated with a first signal in the first time period, and a start moment of the second time period is after an end moment of the first time period. The terminal device receives the first reference signal from the network device. The terminal device processes the second signal based on the first indication information.

In at least one embodiment, after receiving the first indication information sent by the network device, the terminal device learns, based on the first indication information, whether the first reference signal in the first time period is associated with the second signal in the second time period, and process the second signal based on the first indication information. Because the start moment of the second time period is after the end moment of the first time period, the terminal device learns in advance whether the first reference signal is associated with the second signal, and process the second signal based on the first indication information. In addition, this facilitates subsequent processing of the second signal and helps the terminal device determine whether to store the first reference signal.

Optionally, in at least one embodiment of the first aspect, that the terminal device processes the second signal based on the first indication information in the foregoing step includes: The terminal device demodulates the second signal based on the first reference signal in response to determining, based on the first indication information, that the first reference signal is associated with the second signal; and/or the terminal device demodulates the second signal based on a second reference signal in response to determining, based on the first indication information, that the first reference signal is not associated with the second signal, where the second reference signal is associated with the second signal in the second time period.

In at least one embodiment, in response to determining, based on the first indication information, that the first reference signal is associated with the second signal, the terminal device demodulates the second signal based on the first reference signal, and the terminal device demodulates the second signal without receiving the second reference signal sent by the network device. In other words, the network device does not send the second reference signal to the terminal device, and the terminal device demodulates the second signal. This reduces interaction between the network device and the terminal device.

Optionally, in at least one embodiment of the first aspect, the foregoing step further includes: In response to determining, based on the first indication information, that the first reference signal is associated with the first signal, the terminal device stores the first reference signal or a first estimator determined based on the first reference signal. That the terminal device demodulates the second signal based on the first reference signal includes: The terminal device demodulates the second signal based on the first reference signal or the first estimator.

In at least one embodiment, the terminal device determines, based on the first indication information, whether to store the first reference signal. The terminal device stores the first reference signal only in response to determining, based on the first indication information, that the first reference signal is associated with the first signal, and does not store the first reference signal in response to the first reference signal not being associated with the first signal. This reduces storage resource consumption caused by storing the first reference signal.

Optionally, in at least one embodiment of the first aspect, the first estimator in the foregoing step includes any one of the following: a frequency domain signal of the first reference signal, a channel estimation value of a symbol on which the first reference signal is located, the channel estimation value of the symbol on which the first reference signal is located and a channel estimation value of a symbol on which the first signal is located, a channel estimation value of a last symbol carrying the first signal, and a combined value of the channel estimation value of the symbol on which the first reference signal is located and channel estimation values of all or some symbols carrying the first signal.

Optionally, in at least one embodiment of the first aspect, that the first indication information indicates whether a first reference signal in a first time period is associated with a second signal in a second time period in the foregoing step includes: The first indication information indicates a quantity of time units associated with the first reference signal. In response to the quantity of time units being greater than 1, the first indication information indicates that the first reference signal is associated with the second signal. In response to the quantity of time units being equal to 1, the first indication information indicates that the first reference signal is not associated with the second signal, or the first reference signal is associated with only the first signal.

In at least one embodiment, the terminal device determines, based on the quantity of time units indicated in the first indication information, whether the first reference signal is associated with the second signal, and the quantity of time units is able to not be separately indicated. This reduces signaling overheads.

Optionally, in at least one embodiment of the first aspect, the first indication information in the foregoing step is carried in downlink control information DCI, and the DCI indicates the terminal device to receive the first signal, or the DCI indicates the terminal device to receive the first signal and the second signal.

According to a second aspect in at least one embodiment, a signal processing method is provided. The method is performed by a network device, or is performed by a component (for example, a processor, a chip, or a chip system) of the network device. The method includes: The network device sends first indication information to a terminal device, where the first indication information indicates whether a first reference signal in a first time period is associated with a second signal in a second time period, the first reference signal is associated with a first signal in the first time period, and a start moment of the second time period is after an end moment of the first time period. The network device sends the first reference signal to the terminal device.

In at least one embodiment, the network device sends the first indication information to the terminal device, so that the terminal device learns in advance whether the first reference signal is associated with the second signal. This facilitates subsequent processing of the second signal and helps the terminal device determine whether to store the first reference signal.

Optionally, in at least one embodiment of the second aspect, that the first indication information indicates whether a first reference signal in a first time period is associated with a second signal in a second time period in the foregoing step includes: The first indication information indicates a quantity of time units associated with the first reference signal in the first time period. In response to the quantity of time units being greater than 1, the first indication information indicates that the first reference signal is associated with the second signal. In response to the quantity of time units being equal to 1, the first indication information indicates that the first reference signal is not associated with the second signal, or the first reference signal is associated with only the first signal.

In at least one embodiment, the network device sends the first indication information to the terminal device, so that the terminal device determines, based on the quantity of time units indicated in the first indication information, whether the first reference signal is associated with the second signal, and the quantity of time units does not need to be separately indicated. This reduces signaling overheads.

Optionally, in at least one embodiment of the second aspect, the first indication information in the foregoing step is carried in downlink control information DCI, and the DCI indicates the terminal device to receive the first signal, or the DCI indicates the terminal device to receive the first signal and the second signal.

According to a third aspect in at least one embodiment, a signal processing method is provided. The method is performed by a terminal device, or is performed by a component (for example, a processor, a chip, or a chip system) of the terminal device. The method includes: The terminal device receives first indication information from a network device, where the first indication information indicates whether a second reference signal in a second time period is associated with a first signal in a first time period, a first reference signal is associated with the first signal in the first time period, the second reference signal is associated with a second signal in the second time period, and a start moment of the first time period is after an end moment of the second time period. The terminal device receives the first reference signal and the first signal from the network device. The terminal device processes the first signal based on the first indication information.

In at least one embodiment, the terminal device learns, based on the first indication information, whether the second reference signal is associated with the first signal. In response to the second reference signal being associated with the first signal, the terminal device processes the first signal based on the first indication information. In an aspect, the terminal device processes the first signal by using both the first reference signal and the second reference signal. In another aspect, channel estimation precision is improved.

Optionally, in at least one embodiment of the third aspect, that the terminal device processes the first signal based on the first indication information in the foregoing step includes: The terminal device demodulates the first signal based on the first reference signal and the second reference signal in response to determining, based on the first indication information, that the first reference signal is associated with the first signal; and/or the terminal device demodulates the first signal based on the first reference signal in response to determining, based on the first indication information, that the first reference signal is not associated with the first signal.

In at least one embodiment, the terminal device demodulates the first signal by using the first reference signal and the second reference signal, to improve the channel estimation precision.

Optionally, in at least one embodiment of the third aspect, the first indication information in the foregoing step is carried in downlink control information DCI, and the DCI indicates the terminal device to receive the first signal.

According to a fourth aspect in at least one embodiment, a signal processing method is provided. The method is performed by a network device, or is performed by a component (for example, a processor, a chip, or a chip system) of the network device. The method includes: The network device sends first indication information to a terminal device, where the first indication information indicates whether a second reference signal in a second time period is associated with a first signal in a first time period, a first reference signal is associated with the first signal in the first time period, the second reference signal is associated with a second signal in the second time period, and a start moment of the first time period is after an end moment of the second time period. The network device sends the first reference signal and the first signal to the terminal device.

In at least one embodiment, the network device sends the first indication information to the terminal device, so that the terminal device learns whether the second reference signal is associated with the first signal.

Optionally, in at least one embodiment of the fourth aspect, the first indication information in the foregoing step is carried in downlink control information DCI, and the DCI indicates the terminal device to receive the first signal.

According to a fifth aspect of at least one embodiment, a terminal device is provided. The terminal device includes:
  a transceiver unit, configured to receive first indication information from a network device, where the first indication information indicates whether a first reference signal in a first time period is associated with a second signal in a second time period, the first reference signal is associated with a first signal in the first time period, and a start moment of the second time period is after an end moment of the first time period, where
  the transceiver unit is further configured to receive the first reference signal from the network device; and
  a processing unit, configured to process the second signal based on the first indication information.

Optionally, in at least one embodiment of the fifth aspect, the processing unit in the device is specifically configured to demodulate the second signal based on the first reference signal in response to determining, based on the first indication information, that the first reference signal is associated with the first signal; and/or the processing unit is specifically configured to demodulate the second signal based on a second reference signal in response to determining, based on the first indication information, that the first reference signal is not associated with the first signal, where the second reference signal is associated with the second signal in the second time period.

Optionally, in at least one embodiment of the fifth aspect, the processing unit in the device is further configured to: in response to determining, based on the first indication information, that the first reference signal is associated with the first signal, store the first reference signal or a first estimator determined based on the first reference signal; and the processing unit is specifically configured to demodulate the second signal based on the first reference signal or the first estimator.

Optionally, in at least one embodiment of the fifth aspect, the first estimator in the device includes any one of the following: a frequency domain signal of the first reference signal, a channel estimation value of a symbol on which the first reference signal is located, the channel estimation value of the symbol on which the first reference signal is located and a channel estimation value of a symbol on which the first signal is located, a channel estimation value of a last symbol carrying the first signal, and a combined value of the channel estimation value of the symbol on which the first reference signal is located and channel estimation values of all or some symbols carrying the first signal.

Optionally, in at least one embodiment of the fifth aspect, that the first indication information in the device indicates whether a first reference signal in a first time period is associated with a second signal in a second time period includes:

The first indication information indicates a quantity of time units associated with the first reference signal.

In response to the quantity of time units being greater than 1, the first indication information indicates that the first reference signal is associated with the second signal.

In response to the quantity of time units being equal to 1, the first indication information indicates that the first reference signal is not associated with the second signal, or the first reference signal is associated with only the first signal.

Optionally, in at least one embodiment of the fifth aspect, the first indication information in the device is carried in downlink control information DCI, and the DCI indicates the terminal device to receive the first signal, or the DCI indicates the terminal device to receive the first signal and the second signal.

According to a fifth aspect of at least one embodiment, a network device is provided. The network device includes:
  a transceiver unit, configured to send first indication information to a terminal device, where the first indication information indicates whether a first reference signal in a first time period is associated with a second signal in a second time period, the first reference signal is associated with a first signal in the first time period, and a start moment of the second time period is after an end moment of the first time period, where
  the transceiver unit is further configured to send the first reference signal to the terminal device.

Optionally, in at least one embodiment of the sixth aspect, that the first indication information in the device indicates whether a first reference signal in a first time period is associated with a second signal in a second time period includes:

The first indication information indicates a quantity of time units associated with the first reference signal in the first time period.

In response to the quantity of time units being greater than 1, the first indication information indicates that the first reference signal is associated with the second signal.

In response to the quantity of time units being equal to 1, the first indication information indicates that the first reference signal is not associated with the second signal, or the first reference signal is associated with only the first signal.

Optionally, in at least one embodiment of the sixth aspect, the first indication information in the device is carried in downlink control information DCI, and the DCI indicates the terminal device to receive the first signal, or the DCI indicates the terminal device to receive the first signal and the second signal.

According to a seventh aspect of at least one embodiment, a terminal device is provided. The terminal device includes:
  a transceiver unit, configured to receive first indication information from a network device, where the first indication information indicates whether a second reference signal in a second time period is associated with a first signal in a first time period, a first reference signal is associated with the first signal in the first time period, the second reference signal is associated with a second signal in the second time period, and a start moment of the first time period is after an end moment of the second time period, where the transceiver unit is further configured to receive the first reference signal and the first signal from the network device; and a processing unit, configured to process the first signal based on the first indication information.

Optionally, in at least one embodiment of the seventh aspect, the processing unit in the device is specifically configured to demodulate the first signal based on the first reference signal and the second reference signal in response to determining, based on the first indication information, that the first reference signal is associated with the first signal; and/or the processing unit is specifically configured to demodulate the first signal based on the first reference signal in response to determining, based on the first indication information, that the first reference signal is not associated with the first signal.

Optionally, in at least one embodiment of the seventh aspect, the first indication information in the device is carried in downlink control information DCI, and the DCI indicates the terminal device to receive the first signal.

According to an eighth aspect of at least one embodiment, a network device is provided. The network device includes:

a transceiver unit, configured to send first indication information to a terminal device, where the first indication information indicates whether a second reference signal in a second time period is associated with a first signal in a first time period, a first reference signal is associated with the first signal in the first time period, the second reference signal is associated with a second signal in the second time period, and a start moment of the first time period is after an end moment of the second time period, where the transceiver unit is further configured to send the first reference signal and the first signal to the terminal device.

Optionally, in at least one embodiment of the eighth aspect, the first indication information in the device is carried in downlink control information DCI, and the DCI indicates the terminal device to receive the first signal.

According to a ninth aspect in at least one embodiment, a terminal device is provided. The terminal device includes a processor. The processor is coupled to a memory, the memory is configured to store a computer program or instructions, and the processor is configured to execute the computer program or the instructions in the memory, so that the method according to the first aspect is performed, or the method according to the third aspect is performed.

According to a tenth aspect in at least one embodiment, a network device is provided. The network device includes a processor. The processor is coupled to a memory, the memory is configured to store a computer program or instructions, and the processor is configured to execute the computer program or the instructions in the memory, so that the method according to the second aspect is performed, or the method according to the fourth aspect is performed.

According to an eleventh aspect in at least one embodiment, a terminal device is provided. The terminal device includes a processor and a communication interface. The communication interface is coupled to the processor, and the processor is configured to run a computer program or instructions, so that the method according to the first aspect is performed, or the method according to the third aspect is performed.

According to a twelfth aspect in at least one embodiment, a network device is provided. The network device includes a processor and a communication interface. The communication interface is coupled to the processor, and the processor is configured to run a computer program or instructions, so that the method according to the second aspect, or the method according to the fourth aspect is performed.

According to a thirteenth aspect in at least one embodiment, a computer-readable storage medium storing one or more computer-executable instructions is provided. In response to the computer-executable instructions being executed by a processor, the processor performs the method according to the first aspect or the method according to the third aspect.

According to a fourteenth aspect in at least one embodiment, a computer-readable storage medium storing one or more computer-executable instructions is provided. In response to the computer-executable instructions being executed by a processor, the processor performs the method according to the second aspect or the method according to the fourth aspect.

According to a fifteenth aspect in at least one embodiment, a computer program product (or referred to as a computer program) storing one or more computers is provided. In response to the computer program product being executed by a processor, the processor performs the method according to the first aspect or the method according to the third aspect.

According to a sixteenth aspect in at least one embodiment, a computer program product storing one or more computers is provided. In response to the computer program product being executed by a processor, the processor performs the method according to the second aspect or the method according to the fourth aspect.

According to a seventeenth aspect in at least one embodiment, a chip system is provided. The chip system includes a processor, configured to support a terminal device in implementing functions in the first aspect or the third aspect. In at least one embodiment, the chip system further includes a memory, and the memory is configured to store program instructions and data that are necessary for the terminal device. The chip system includes a chip, or includes a chip and another discrete component.

According to an eighteenth aspect in at least one embodiment, a chip system is provided. The chip system includes a processor, configured to support a network device in implementing functions in the second aspect or the fourth aspect. In at least one embodiment, the chip system further includes a memory, and the memory is configured to store program instructions and data that are necessary for the network device. The chip system includes a chip, or includes a chip and another discrete component.

According to a nineteenth aspect in at least one embodiment, a communication system is provided. The communication system includes the terminal device in the fifth aspect and the network device in the sixth aspect, or the communication system includes the terminal device in the seventh aspect and the network device in the eighth aspect, or the communication system includes the terminal device in the ninth aspect and the network device in the tenth aspect, or the communication system includes the terminal device in the eleventh aspect and the network device in the twelfth aspect.

For technical effects brought by the fifth aspect, the seventh aspect, the ninth aspect, the eleventh aspect, the thirteenth aspect, the fifteenth aspect, the seventeenth aspect, the nineteenth aspect refer to the technical effects brought by the first aspect, or refer to the technical effects brought by the third aspect. Details are not described herein again.

For technical effects brought by the sixth aspect, the eighth aspect, the tenth aspect, the twelfth aspect, the fourteenth aspect, the sixteenth aspect, the eighteenth aspect, the nineteenth aspect refer to the technical effects brought by the second aspect, or refer to the technical effects brought by the fourth aspect. Details are not described herein again.

DETAILED DESCRIPTION OF EMBODIMENTS

Embodiments described herein provide a signal processing method and an apparatus, to reduce buffer overheads of an end device.

The following clearly describes technical solutions in at least one embodiment with reference to the accompanying drawings. The described embodiments are merely some but not all of embodiments.

Embodiments described herein are applied to protocol frameworks of a plurality of wireless communication systems. The wireless communication systems include but are not limited to an LTE system, an NR system, a future evolved communication system, and the like. The future evolved communication system is, for example, a future network or a 6th generation communication system.

Figure 1:
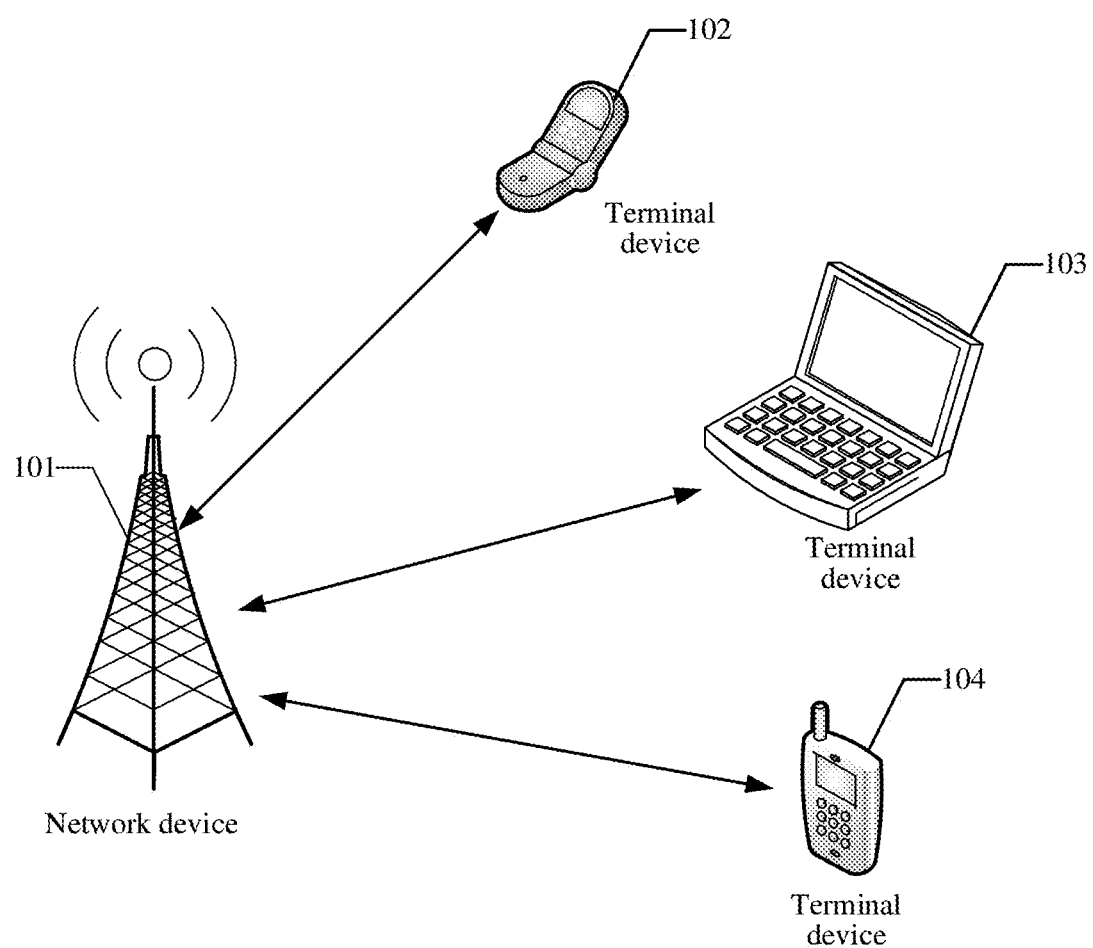
FIG. 1 is a schematic diagram of a communication system according to at least one embodiment.

FIG. 1 is a schematic diagram of a communication system. The communication system includes a network device 101 and terminal devices 102 to 104 connected to the network device 101.

The network device 101 is configured to: receive uplink signals from the terminal devices 102 to 104, or send downlink signals to the terminal devices 102 to 104.

The terminal devices 102 to 104 are configured to: send uplink signals to the network device 101, or receive downlink signals from the network device 101.

In at least one embodiment, one network device 101 and three terminal devices 102 to 104 are merely used as an example for description. During actual application, the communication system in at least one embodiment includes more network devices 101 and terminal devices 102, and there is one or more terminal devices 102. A quantity of network devices 101 and a quantity of terminal devices 102 are not limited in at least one embodiment.

In at least one embodiment, the network device 101 is an apparatus that is deployed in a radio access network and that provides a wireless communication function for a terminal device. The network device includes various forms of base stations: a macro base station, a micro base station (also referred to as a small cell), a relay station, an access point, and the like. In systems using different radio access technologies, names of network devices is different, for example, an eNB or an eNodeB (Evolved NodeB) in LTE. The network device is alternatively a radio controller in a cloud radio access network (cloud radio access network, CRAN) scenario. The network device is alternatively a base station device in a 5G network or a network device in a future evolved network. The network device is alternatively a wearable device or a vehicle-mounted device. The network device is alternatively a transmission reception point (transmission reception point, TRP). The network device is alternatively a general term of all devices at a network end. For example, in response to a plurality of TRPs being used to transmit data to the terminal device, the plurality of TRPs are collectively referred to as the network device.

In at least one embodiment, the terminal devices 102 to 104 are devices having a wireless transceiver function, and is deployed on land, where the deployment includes indoor or outdoor, handheld, wearable, or vehicle-mounted deployment, is deployed on water (for example, on a ship), or is deployed in air (for example, on an airplane, a balloon, and a satellite). The terminal device is a mobile phone (mobile phone), a tablet computer (pad), a computer having a wireless transceiver function, a virtual reality (virtual reality, VR) terminal device, an augmented reality (augmented reality, AR) terminal device, a wireless terminal in industrial control (industrial control), a vehicle-mounted terminal device, a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a wearable terminal device, or the like. An application scenario is not limited in at least one embodiment. The terminal device sometimes is referred to as a terminal, user equipment (user equipment, UE), an access terminal device, a vehicle-mounted terminal, an industrial control terminal, a UE unit, a UE station, a mobile station, a remote station, a remote terminal device, a mobile device, a UE agent, a UE apparatus, or the like. The terminal device is also fixed or mobile.

Figure 2:
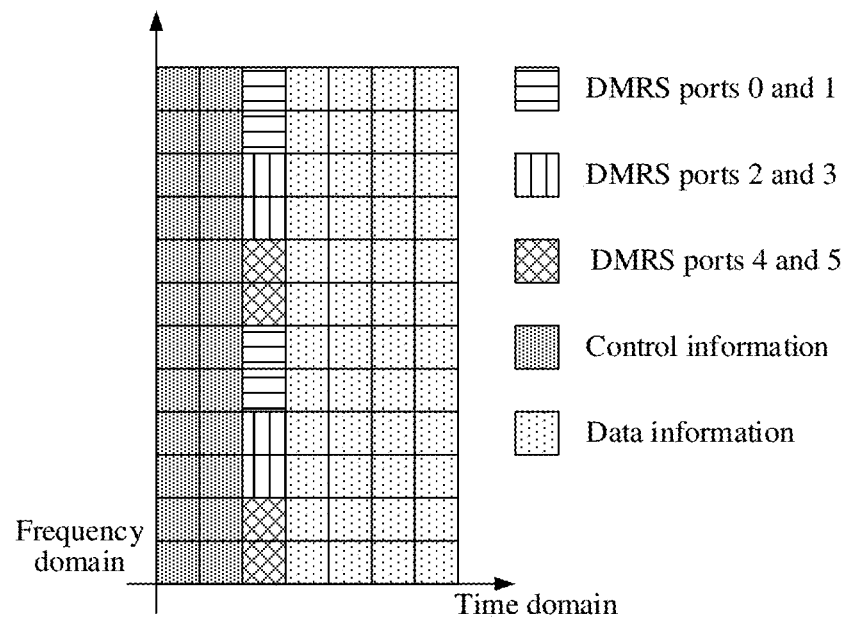
FIG. 2 is a schematic diagram of a structure of code division multiplexing according to at least one embodiment.

In an existing wireless communication system, a network device is equipped with a plurality of antennas to implement spatial multiplexing transmission by using a multiple input multiple output (multiple input multiple output, MIMO) technology. To be specific, a plurality of data flows are transmitted on a same time-frequency resource, and each data flow is transmitted at an independent spatial layer. In addition, each spatial layer is mapped to a different antenna port for sending. Considering that channel coefficients from different antenna ports to a terminal device are different, to enable the terminal device to obtain information transmitted at a plurality of spatial layers, a channel coefficient between each antenna port and the terminal device needs to be estimated. Therefore, different DMRSs need to be configured for the antenna ports, and DMRSs corresponding to different antenna ports is multiplexed in a time division manner, a frequency division manner, a code division manner, or the like. For example, as shown in FIG. 2, a horizontal direction represents a time domain, a vertical direction represents a frequency domain, and each small block represents one RE. DMRS ports 0 and 1 are multiplexed by using an orthogonal code, so that REs corresponding to the two ports are also referred to as a code division multiplexing (code division multiplexing, CDM) group. In the example shown in FIG. 2, a total quantity of DMRS ports is 6, and a quantity of CDM groups is 3.

Figure 3:
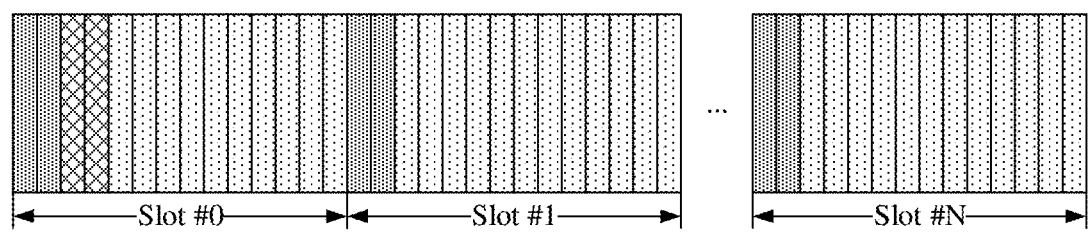
FIG. 3 is a schematic diagram of a relational structure between a slot and a DMRS signal according to at least one embodiment.

Currently, 5G NR supports a fixed access node, and a channel of the access node changes slowly with time. Therefore, channels of adjacent slots in terms of time is considered to be approximately equal. In this case, DMRSs is not configured for some slots, and data demodulation is performed for these slots by using channels estimated based on DMRSs in previous slots. This helps reduce pilot overheads. For example, as shown in FIG. 3, two DMRS symbols are configured in a slot #0, and no DMRS symbol is configured in a subsequent slot #1 to a subsequent slot #N.

However, after determining that there is a DMRS in the slot #0, a terminal device cannot determine whether there is a DMRS in the subsequent slot #1. Even in response to a DMRS being configured in the subsequent slot #1, the terminal also buffers the DMRS signal or a channel estimation value in the slot #0. Consequently, buffer overheads of the terminal device are undoubtedly increased.

To resolve the foregoing problem, embodiments described herein provide a signal processing method. The following describes the signal processing method in at least one embodiment with reference to the communication system in FIG. 1. An example in which the network device is a base station and the terminal device is UE is used for description.

There are a plurality of cases of a relationship between a first time period and a second time period in at least one embodiment, and the cases are separately described below.

Figure 4:
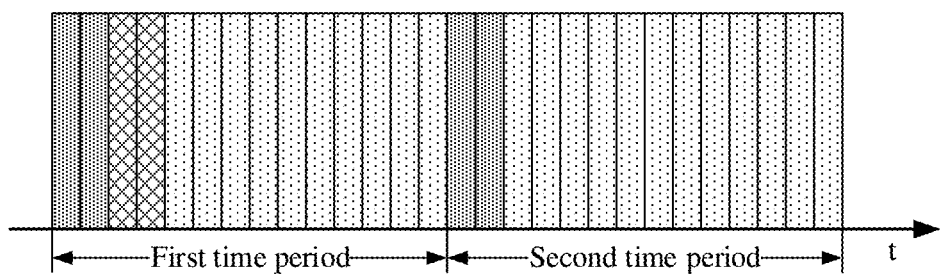
FIG. 4 is a schematic diagram of a relational structure between a second time period and a first time period according to at least one embodiment.

Case 1: A start moment of the second time period is after an end moment of the first time period, for example, as shown in FIG. 4.

Figure 5:
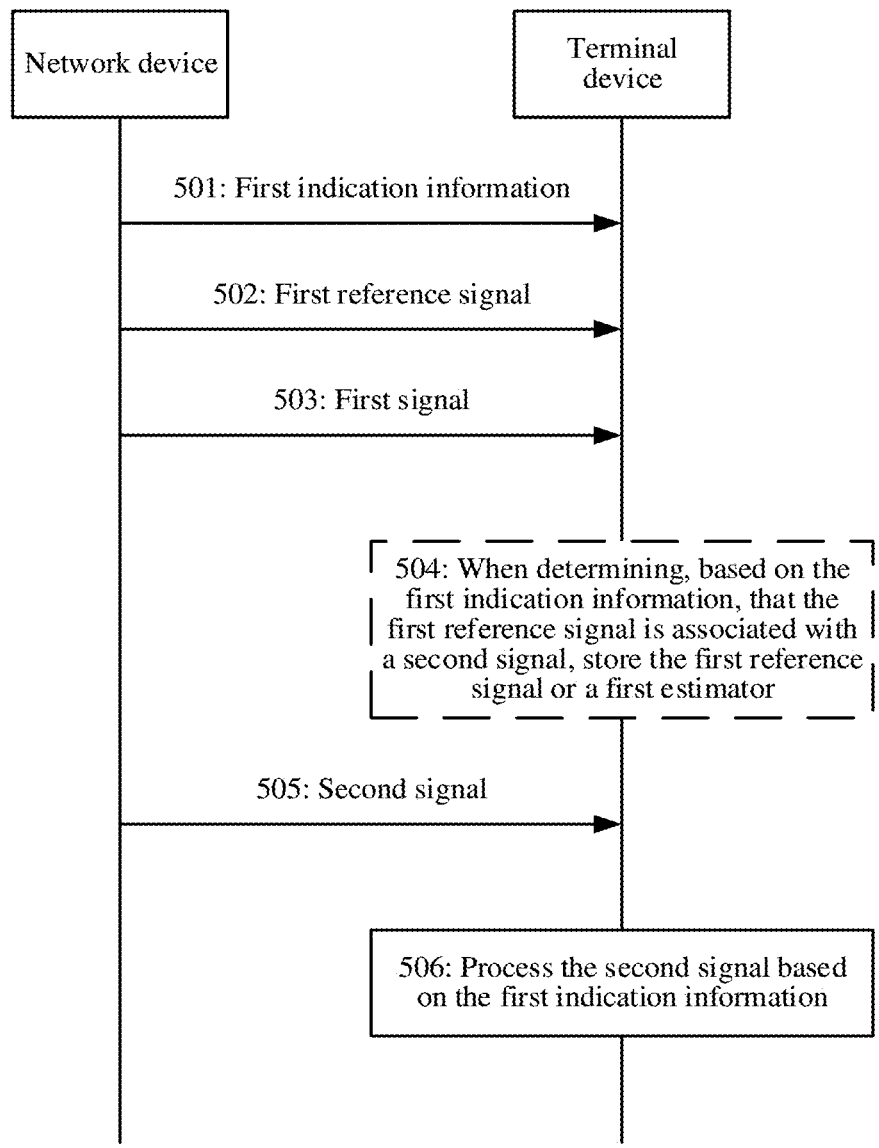
FIG. 5 is a schematic flowchart of a signal processing method according to at least one embodiment.

With reference to FIG. 5, at least one embodiment includes the following steps.

501: The network device sends first indication information to the terminal device. Correspondingly, the terminal device receives the first indication information.

The first indication information in at least one embodiment is carried in downlink control information DCI, radio resource control (radio resource control, RRC) layer signaling, or media access control (media access control, MAC) layer signaling. In addition to the three examples, there are other cases of the first indication information. This is not specifically limited herein.

In response to the first indication information being carried in first DCI, the first DCI is carried on a first physical downlink control channel (physical downlink control channel, PDCCH).

A first reference signal in at least one embodiment is a DMRS, or is another reference signal, for example, a phase tracking reference signal (phase tracking reference signal, PTRS). This is not specifically limited herein.

The first indication information in at least one embodiment indicates whether the first reference signal in the first time period is associated with a second signal in the second time period. The first reference signal is associated with a first signal.

In at least one embodiment, that a reference signal is associated with a signal is that the reference signal is used to process the signal. That the first reference signal is associated with the first signal or the first reference signal is associated with the second signal is that the first reference signal is used to process the first signal or the second signal. For example, the first reference signal is used to demodulate the first signal or the second signal, or the first reference signal is used to demodulate a physical downlink shared channel (physical downlink shared channel, PDSCH), where the PDSCH carries the first signal or the second signal. It should be understood that, that the first reference signal is used to demodulate the first signal or the second signal is usually that some intermediate parameters are obtained based on the first reference signal, and these intermediate parameters is used to demodulate the first signal or the second signal. In addition to demodulating the first signal or the second signal, processing the first signal or the second signal is detecting the first signal or the second signal, or performing an operation such as decoding on the first signal or the second signal. In addition, demodulation is understood in a broad sense as an operation of processing the first signal or the second signal to obtain information carried in the first signal or the second signal. Demodulation is one step, or is a general term of a plurality of steps.

There are a plurality of manners in which the first indication information in at least one embodiment indicates whether the first reference signal in the first time period is associated with the second signal in the second time period, and the manners are separately described below.

1. The first indication information indicates, by using a 1-bit field, whether the first reference signal is associated with the second signal.

In response to the 1-bit field being "0", the first reference signal in the first time period is not associated with the second signal in the second time period. Specifically, a first DMRS used in the first time period is not used to demodulate the second signal in the second time period.

In response to the 1-bit field being "1", the first reference signal in the first time period is associated with the second signal in the second time period. Specifically, a first DMRS used in the first time period is used to demodulate the second signal in the second time period.

2. The first indication information indicates, by using a total quantity of time units included in the first time period and the second time period, whether the first reference signal is associated with the second signal.

Details are shown in Table 1.

TABLE 1

| Value of a field | Determine whether the first reference signal in the first time period is associated with the second signal in the second time period | Quantity of time units |
| --- | --- | --- |
| 00 | No | 1 |
| 01 | Yes | 1 |
| 10 | Yes | 2 |
| 11 | Yes | 4 |

The first indication information specifically indicates the total quantity of time units included in the first time period and the second time period, in other words, indicates a quantity of time units associated with the first reference signal. In response to the field in the first indication information being "00", the quantity of time units associated with the first reference signal is 1, and the first reference signal in the first time period is not associated with the second signal in the second time period. In response to the field in the first indication information being "01", the quantity of time units associated with the first reference signal being 1, and the first reference signal in the first time period is associated with the second signal in the second time period. In response to the field in the first indication information being "10", the quantity of time units associated with the first reference signal is 2, and the first reference signal in the first time period is associated with the second signal in the second time period. In response to the field in the first indication information being "11", the quantity of time units associated with the first reference signal is 4, and the first reference signal in the first time period is associated with the second signal in the second time period. Alternatively, in response to the quantity of time units being greater than 1, the first indication information indicates that the first reference signal is associated with the second signal. In response to the quantity of time units being equal to 1, the first indication information indicates that the first reference signal is not associated with the second signal, or the first reference signal is associated with only the first signal.

The several cases in Table 1 are merely examples. During actual application, a format of the first indication information is set based on a requirement. A setting and a meaning of the field in the first indication information are not limited herein.

The time unit in at least one embodiment is a subframe, a slot, a sub-slot, a symbol, or another time domain parameter (namely, another time domain unit). The first time period and the second time period each includes one or more time units. This is not specifically limited herein.

3. In response to the terminal device not receiving the first indication information, the terminal device considers by default that the first reference signal in the first time period is not associated with the second signal in the second time period.

There are a plurality of manners in which the first indication information in at least one embodiment indicates whether the first reference signal in the first time period is associated with the second signal in the second time period. The foregoing three manners are merely examples. This is not specifically limited herein.

The first indication information further indicates the terminal device to receive the first signal in the first time period.

Optionally, the first indication information further indicates the terminal device to receive the first signal in the first time period and the second signal in the second time period.

502: The network device sends the first reference signal to the terminal device.

Correspondingly, the terminal device receives the first reference signal.

The network device sends the first reference signal to the terminal device, where the first reference signal is used to demodulate the first signal in the first time period or a first PDSCH carrying the first signal. The first reference signal is not necessarily sent in the first time period. Alternatively, the network device sends the first reference signal to the terminal device before step 501.

The terminal device receives the first reference signal sent by the network device.

Optionally, after receiving the first reference signal, the terminal device determines a first estimation value based on the first reference signal. The first estimation value includes: a frequency domain signal of the first reference signal, a channel estimation value of a symbol on which the first reference signal is located, the channel estimation value of the symbol on which the first reference signal is located and a channel estimation value of a symbol on which the first signal is located, a channel estimation value of a last symbol carrying the first signal, a combined value of the channel estimation value of the symbol on which the first reference signal is located and channel estimation values of all or some symbols carrying the first signal, and the like. The first estimation value is not specifically limited herein.

For example, the first reference signal is carried on at least one RE. In response to the first reference signal being carried on N REs, frequency domain signals of the first reference signal received by the terminal device is represented by (y1, y2, ..., yN). A signal yn on an $n^{th}$ RE is usually represented by a complex number, including a real part and an imaginary part. The first reference signal received by the terminal device is a signal after the first reference signal sent by the network device passes through a wireless channel. The first reference signal sent by the network device is represented by (s1, s2, ..., sN). In this case, the terminal device performs estimation based on (y1, y2, ..., yN) and (s1, s2, ..., sN), to obtain the channel estimation value of the symbol on which the first reference signal is located. For example, the channel estimation value is obtained according to yn/sn. In other words, the channel estimation value is (h1, h2, ..., hN), where $hn=yn/sn$ or $hn=yn*sn^{H}/sn*sn^{H}$. A specific calculation method is not limited herein. The channel estimation value of the symbol on which the first signal is located is obtained through processing based on the channel estimation value (h1, h2, hN) of the symbol on which the first reference signal is located. A direct method is a copying method. To be specific, the channel estimation value (f1, f2, ..., fN) of the symbol on which the first signal is located=(h1, h2, hN). Alternatively, another calculation method is used, for example, (f1, f2, ..., fN)=(h1, h2, hN)*alpha, where alpha is a preset parameter. In addition, the combined value of the channel estimation value of the symbol on which the first reference signal is located and the channel estimation values of all or some symbols carrying the first signal is obtained through processing based on both (h1, h2, hN) and (f1, f2, ..., fN). For example, an $n^{th}$ value in the combined value (g1, g2, ..., gN) is gn=(hn+fn)/2, or gn=hn*alpha+fn*beta, where alpha and beta are preset parameters.

The first estimation value is used to demodulate the first signal in the first time period or the first PDSCH.

Optionally, in response to the first reference signal being associated with the second signal, the first estimation value is further used to demodulate the second signal in the second time period or a second PDSCH carrying the second signal.

503: The network device sends the first signal to the terminal device. Correspondingly, the terminal device receives the first signal.

After sending the first indication information to the terminal device, the network device sends the first signal to the terminal device based on the first indication information. The terminal device receives the first signal based on the received first indication information.

Optionally, the first signal is carried on the first PDSCH.

In at least one embodiment, the first PDSCH and the second PDSCH is PDSCHs scheduled by using same indication information sent by the network device to the terminal device. For example, both the first PDSCH and the second PDSCH are scheduled by using the first DCI. The first PDSCH and the second PDSCH is alternatively PDSCHs scheduled by using different indication information sent by the network device to the terminal device. For example, the first PDSCH is scheduled by using the first DCI, and the second PDSCH is scheduled by using second DCI.

Optionally, after receiving the first signal, the terminal device demodulates the first signal or the first PDSCH by using the first reference signal or the first estimation value.

504: In response to determining, based on the first indication information, that the first reference signal is associated with the second signal, the terminal device stores the first reference signal or the first estimation value. This step is optional.

After the terminal device receives the first indication information, in response to the first indication information indicating that the first reference signal is associated with the second signal (for example, the corresponding field of the first indication information in Table 1 is "1", "01", "10", or "11"), the terminal device stores the first reference signal or the first estimation value.

That the first reference signal is associated with the second signal is that the quantity of time units associated with the first reference signal is greater than 1, or is that the first reference signal is used to demodulate the second signal, or is that the first reference signal is used to demodulate the second PDSCH. It is understood that in addition to the three cases in which the first reference signal is associated with the second signal, there are other manners. This is not specifically limited herein.

In response to the first indication information indicating that the first reference signal is not associated with the second signal, the terminal device does not store the first reference signal. In this way, storage space of the terminal device is saved.

505: The network device sends the second signal to the terminal device. Correspondingly, the terminal device receives the second signal.

Optionally, the network device sends second indication information and the second signal to the terminal device, where the second indication information is used by the terminal device to receive the second signal.

Optionally, the second signal is carried on the second PDSCH.

506: The terminal device processes the second signal based on the first indication information.

After receiving the first indication information and the second signal, the terminal device processes the second signal based on the first indication information.

In at least one embodiment, there are a plurality of cases in which the terminal device processes the second signal based on the first indication information. The following separately describes the cases.

1. In response to the terminal device determining, based on the first indication information, that the first reference signal is associated with the second signal, the terminal device demodulates the second signal or the second PDSCH based on the first reference signal.

Optionally, the network device has sent, to the terminal device, a second reference signal used to process the second signal. However, the terminal device does not demodulate the second signal or the second PDSCH by using the second reference signal, and demodulates the second signal or the second PDSCH by using the first reference signal.

2. In response to the terminal device determining, based on the first indication information, that the first reference signal is not associated with the second signal, in response to the network device sending a second reference signal to the terminal device, the terminal device demodulates the second signal or the second PDSCH based on the second reference signal.

In at least one embodiment, the foregoing two cases are merely examples. That the terminal device processes the second signal based on the first indication information is alternatively an operation in which the terminal device performs detection, decoding, and the like on the second signal based on the first indication information to process the second signal, to obtain information carried in the second signal. This is not specifically limited herein.

Optionally, as shown in FIG. 4, the network device sends the first DMRS (an example of the first reference signal) to the terminal device in the first time period, instead of sending a second DMRS to the terminal device in the second time period. To be specific, in response to the first reference signal being associated with the second signal, the terminal device processes, by using the first DMRS in the first time period, the second signal in the second time period or the second PDSCH carrying the second signal. A delay and resource consumption caused in response to the network device allocating the second DMRS to the terminal device are reduced.

In at least one embodiment, step 502 is alternatively performed before step 501, step 503 is alternatively performed before step 502, and step 504 is alternatively performed after step 505. This is not specifically limited herein.

In at least one embodiment, the terminal device learns, based on the first indication information, whether the first reference signal is associated with the second signal, and process the second signal based on the first indication information. In addition, in response to the first reference signal being associated with the second signal, the terminal device stores the first reference signal, and process the second signal by using the first reference signal. In response to the first reference signal not being associated with the second signal, the terminal device does not store the first reference signal. This reduces buffer overheads of the terminal device.

Figure 6:
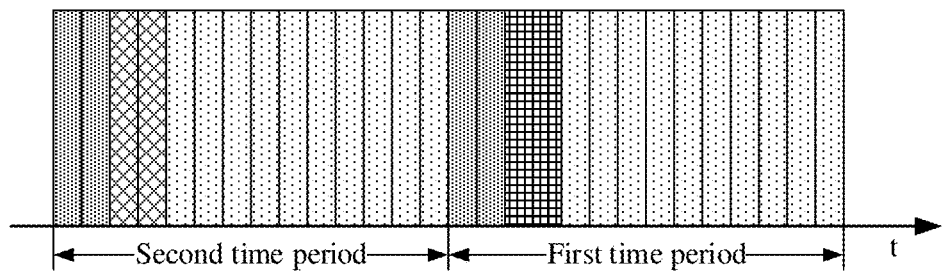
FIG. 6 is a schematic diagram of another relational structure between a second time period and a first time period according to at least one embodiment.

Case 2: A start moment of the first time period is after an end moment of the second time period, for example, as shown in FIG. 6.

Figure 7:
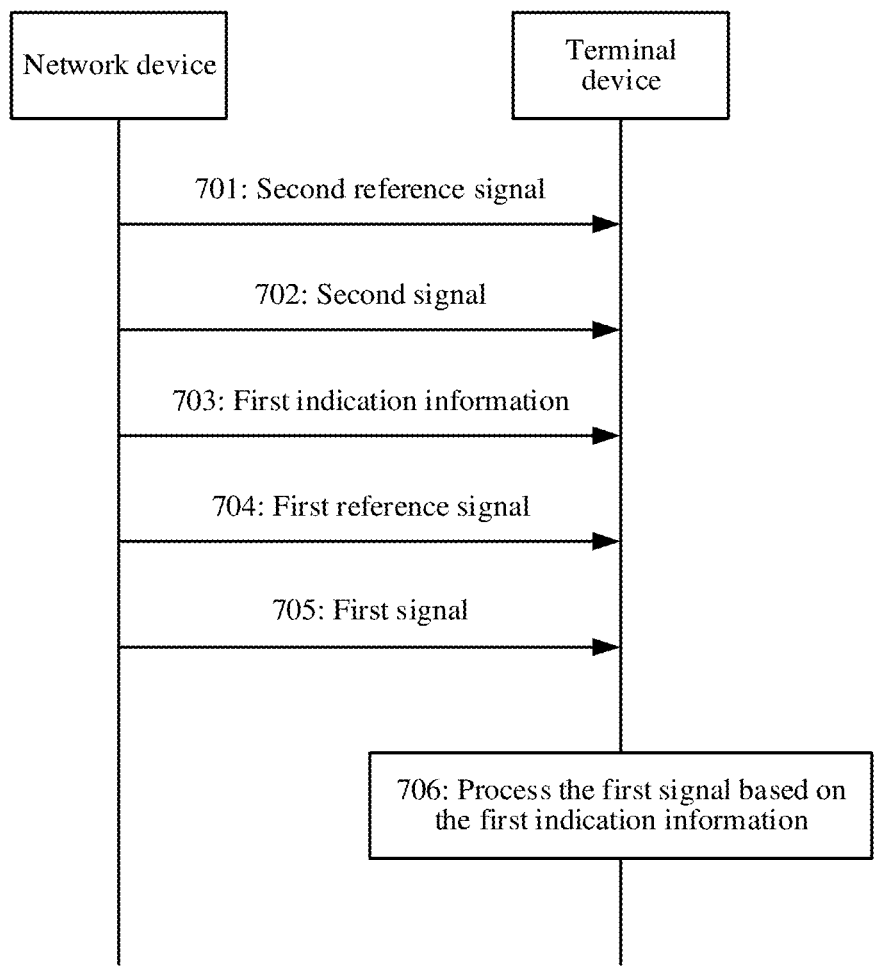
FIG. 7 is another schematic flowchart of a signal processing method according to at least one embodiment.

With reference to FIG. 7, at least one embodiment includes the following steps.

701: The network device sends a second reference signal to the terminal device.

Correspondingly, the terminal device receives the second reference signal.

The network device sends the second reference signal to the terminal device, where the second reference signal is used to demodulate a second signal in the second time period or a second PDSCH carrying the second signal.

The terminal device receives the second reference signal from the network device.

Optionally, after receiving the second reference signal, the terminal device determines a second estimation value based on the second reference signal. The second estimation value includes: a frequency domain signal of the second reference signal, a channel estimation value of a symbol on which the second reference signal is located, the channel estimation value of the symbol on which the second reference signal is located and a channel estimation value of a symbol on which the second signal is located, a channel estimation value of a last symbol carrying the second signal, a combined value of the channel estimation value of the symbol on which the second reference signal is located and channel estimation values of all or some symbols carrying the second signal, and the like. The second estimation value is not specifically limited herein.

The second estimation value is used to demodulate the second signal in the second time period or the second PDSCH.

702: The network device sends the second signal to the terminal device. Correspondingly, the terminal device receives the second signal.

The network device sends the second signal to the terminal device in the second time period.

Optionally, the second signal is carried on the second PDSCH.

Optionally, after receiving the second signal, the terminal device demodulates the second signal or the second PDSCH by using the second reference signal or the second estimation value.

703: The network device sends first indication information to the terminal device. Correspondingly, the terminal device receives the first indication information.

The terminal device receives the first indication information from the network device, where the first indication information indicates whether the second reference signal in the second time period is associated with a first signal in the first time period.

In at least one embodiment, whether the second reference signal in the second time period is associated with the first signal in the first time period is whether the second reference signal is associated with a first reference signal, or is whether both the second reference signal and the second reference signal are used to process the first signal or a first PDSCH carrying the first signal. This is not specifically limited herein.

Second indication information in at least one embodiment is carried in DCI, RRC layer signaling, or MAC layer signaling. It is understood that in addition to the three examples, there are other cases of the second indication information. This is not specifically limited herein.

In response to the second indication information being carried in second DCI, the second DCI is carried on a second PDCCH.

In addition, the first reference signal is associated with the first signal in the first time period, and the second reference signal is associated with the second signal in the second time period.

In at least one embodiment, that the first reference signal is associated with the first signal is that the first reference signal is used to process the first signal. For example, the first reference signal is used to demodulate the first signal, or the first reference signal is used to demodulate the first PDSCH, where the first PDSCH carries the first signal. It should be understood that, that the first reference signal is used to demodulate the first signal is usually that some intermediate parameters are obtained based on the first reference signal, and these intermediate parameters is used to demodulate the first signal. In addition to demodulating the first signal, processing the first signal is detecting the first signal, or performing an operation such as decoding on the first signal. In addition, demodulation is understood in a broad sense as an operation of processing the first signal to obtain information carried in the first signal. Demodulation is one step, or is a general term of a plurality of steps.

In at least one embodiment, that the second reference signal is associated with the second signal is that the second reference signal is used to process the second signal. For example, the second reference signal is used to demodulate the second signal, or the second reference signal is used to demodulate the second PDSCH, where the second PDSCH carries the second signal. It should be understood that, that the second reference signal is used to demodulate the second signal is usually that some intermediate parameters are obtained based on the second reference signal, and these intermediate parameters is used to demodulate the second signal. In addition to demodulating the second signal, processing the second signal is detecting the second signal, or performing an operation such as decoding on the second signal. In addition, demodulation is understood in a broad sense as an operation of processing the second signal to obtain information carried in the second signal. Demodulation is one step, or is a general term of a plurality of steps.

704: The network device sends the first reference signal to the terminal device. Correspondingly, the terminal device receives the first reference signal.

The network device sends the first reference signal to the terminal device, where the first reference signal is used to demodulate the first signal in the first time period or the first PDSCH carrying the first signal. It is understood that the first reference signal is not necessarily sent in the first time period. Alternatively, the network device sends the second reference signal to the terminal device before step 703.

The terminal device receives the first reference signal sent by the network device.

Optionally, after receiving the first reference signal, the terminal device determines a third estimation value based on the second reference signal and the first reference signal. The third estimation value includes: frequency domain signals of the first reference signal and the second reference signal, channel estimation values of symbols on which the first reference signal and the second reference signal are separately located, the channel estimation values of the symbols on which the first reference signal and the second reference signal are separately located and channel estimation values of symbols on which the first signal and the second signal are separately located, a channel estimation value of a last symbol carrying the first signal and a channel estimation value of a last symbol carrying the second signal, a combined value of the channel estimation values of the symbols on which the first reference signal and the second reference signal are separately located, channel estimation values of all or some symbols carrying the first signal, and channel estimation values of all or some symbols carrying the second signal, and the like. The third estimation value is not specifically limited herein.

The third estimation value is used to demodulate the first signal in the first time period or the first PDSCH.

705: The network device sends the first signal to the terminal device. Correspondingly, the terminal device receives the first signal.

After sending the first indication information to the terminal device, the network device sends the first signal to the terminal device based on the first indication information. The terminal device receives the first signal based on the received first indication information.

Optionally, the first signal is carried on the first PDSCH.

Optionally, after receiving the first signal, the terminal device demodulates the first signal or the first PDSCH by using the second reference signal and the first reference signal or by using the third estimation value.

706: The terminal device processes the first signal based on the first indication information.

After receiving the second reference signal, the first indication information, the first reference signal, and the second signal, the terminal device processes the first signal based on the first indication information.

In at least one embodiment, there are a plurality of cases in which the terminal device processes the first signal based on the first indication information. The following separately describes the cases.

1. In response to the terminal device determining, based on the first indication information, that the second reference signal is associated with the first signal, the terminal device demodulates the first signal or the first PDSCH based on the first reference signal and the second reference signal.

2. In response to the terminal device determining, based on the first indication information, that the first reference signal is not associated with the first signal, the terminal device demodulates the first signal based on the first reference signal.

In at least one embodiment, the foregoing two cases are merely examples. That the terminal device processes the first signal based on the first indication information is alternatively an operation in which the terminal device performs detection, decoding, and the like on the first signal based on the first indication information to process the first signal, to obtain the information carried in the first signal. This is not specifically limited herein.

Optionally, as shown in FIG. 6, the network device sends a second DMRS (an example of the second reference signal) to the terminal device in the second time period, instead of sending a first DMRS to the terminal device in the first time period. In response to the second reference signal being associated with the first signal, the terminal device processes, by using both the first DMRS and the second DMRS, the first signal in the first time period or the first PDSCH carrying the first signal. In other words, the terminal device performs processing by using both the first DMRS and the second DMRS, to obtain the third estimation value, so that channel estimation precision is improved.

In at least one embodiment, step 704 is alternatively performed before step 703, step 704 is alternatively performed before step 701, and step 705 is alternatively performed before step 704. This is not specifically limited herein.

In at least one embodiment, the terminal device learns, based on the first indication information, whether the second reference signal is associated with the first signal. In response to the second reference signal being associated with the first signal, the terminal device performs processing by using both the first reference signal and the second reference signal, to obtain the third estimation value, so that the channel estimation precision is improved.

In correspondence to the methods provided in the foregoing method embodiments, embodiments described herein further provide corresponding apparatuses, including corresponding modules configured to perform the foregoing embodiments. The module is software, hardware, or a combination of software and hardware.

Figure 8:
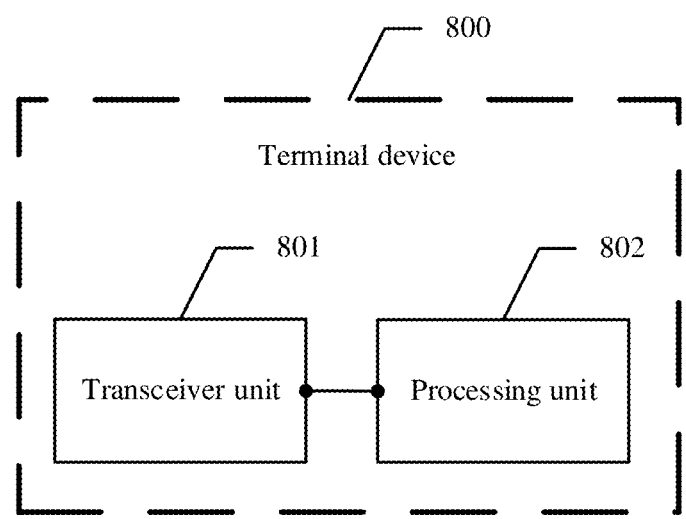
FIG. 8 is a schematic diagram of a structure of a terminal device according to at least one embodiment.

FIG. 8 is a schematic diagram of a terminal device 800 according to at least one embodiment. The terminal device 800 includes:

a transceiver unit 801, configured to receive first indication information from a network device, where the first indication information indicates whether a first reference signal in a first time period is associated with a second signal in a second time period, the first reference signal is associated with a first signal in the first time period, and a start moment of the second time period is after an end moment of the first time period, where the transceiver unit 801 is further configured to receive the first reference signal from the network device; and a processing unit 802, configured to process the second signal based on the first indication information.

In at least one embodiment, the processing unit 802 is specifically configured to demodulate the second signal based on the first reference signal in response to determining, based on the first indication information, that the first reference signal is associated with the first signal; and/or the processing unit 802 is specifically configured to demodulate the second signal based on a second reference signal in response to determining, based on the first indication information, that the first reference signal is not associated with the first signal, where the second reference signal is associated with the second signal in the second time period.

In at least one embodiment, the processing unit 802 is further configured to: in response to determining, based on the first indication information, that the first reference signal is associated with the first signal, store the first reference signal or a first estimator determined based on the first reference signal; and the processing unit is specifically configured to demodulate the second signal based on the first reference signal or the first estimator.

In at least one embodiment, the first estimator includes any one of the following: a frequency domain signal of the first reference signal, a channel estimation value of a symbol on which the first reference signal is located, the channel estimation value of the symbol on which the first reference signal is located and a channel estimation value of a symbol on which the first signal is located, a channel estimation value of a last symbol carrying the first signal, and a combined value of the channel estimation value of the symbol on which the first reference signal is located and channel estimation values of all or some symbols carrying the first signal.

In at least one embodiment, that the first indication information indicates whether a first reference signal in a first time period is associated with a second signal in a second time period includes: The first indication information indicates a quantity of time units associated with the first reference signal. In response to the quantity of time units is greater than 1, the first indication information indicates that the first reference signal is associated with the second signal. In response to the quantity of time units is equal to 1, the first indication information indicates that the first reference signal is not associated with the second signal, or the first reference signal is associated with only the first signal.

In at least one embodiment, the first indication information is carried in downlink control information DCI, and the DCI indicates the terminal device to receive the first signal, or the DCI indicates the terminal device to receive the first signal and the second signal.

In this embodiment, operations performed by the units in the terminal device are similar to those described in the embodiment shown in FIG. 5 or FIG. 7. Details are not described herein again.

In this embodiment, the transceiver unit 801 learns, based on the received first indication information, whether the first reference signal is associated with the second signal, and the processing unit 802 further processes the second signal based on the first indication information. In response to the first reference signal being associated with the second signal, the processing unit 802 further stores the first reference signal, and process the second signal by using the first reference signal. In response to the first reference signal not being associated with the second signal, the processing unit 802 does not store the first reference signal. This reduces buffer overheads of the terminal device.

In at least one embodiment, the terminal device 800 includes:

a transceiver unit 801, configured to receive first indication information from a network device, where the first indication information indicates whether a second reference signal in a second time period is associated with a first signal in a first time period, a first reference signal is associated with the first signal in the first time period, the second reference signal is associated with a second signal in the second time period, and a start moment of the first time period is after an end moment of the second time period, where the transceiver unit 801 is further configured to receive the first reference signal and the first signal from the network device; and a processing unit 802, configured to process the first signal based on the first indication information.

In at least one embodiment, the processing unit 802 is specifically configured to demodulate the first signal based on the first reference signal and the second reference signal in response to determining, based on the first indication information, that the first reference signal is associated with the first signal; and/or the processing unit 802 is specifically configured to demodulate the first signal based on the first reference signal in response to determining, based on the first indication information, that the first reference signal is not associated with the first signal.

In at least one embodiment, the first indication information is carried in downlink control information DCI, and the DCI indicates the terminal device to receive the first signal.

In this embodiment, operations performed by the units in the terminal device are similar to those described in the embodiment shown in FIG. 5 or FIG. 7. Details are not described herein again.

In this embodiment, the transceiver unit 801 learns, based on the received first indication information, whether the second reference signal is associated with the first signal. In response to the second reference signal being associated with the first signal, the processing unit 802 performs processing by using both the first reference signal and the second reference signal, to obtain a third estimation value, so that channel estimation precision is improved.

Figure 9:
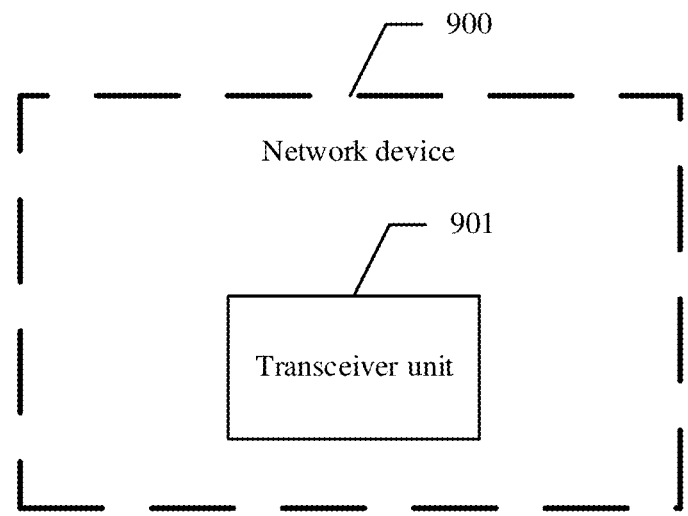
FIG. 9 is a schematic diagram of a structure of a network device according to at least one embodiment.

FIG. 9 is a schematic diagram of a network device 900 according to at least one embodiment. The network device includes:

a transceiver unit 901, configured to send first indication information to a terminal device, where the first indication information indicates whether a first reference signal in a first time period is associated with a second signal in a second time period, the first reference signal is associated with a first signal in the first time period, and a start moment of the second time period is after an end moment of the first time period, where the transceiver unit 901 is further configured to send the first reference signal to the terminal device.

In at least one embodiment, that the first indication information indicates whether a first reference signal in a first time period is associated with a second signal in a second time period includes: The first indication information indicates a quantity of time units associated with the first reference signal in the first time period. In response to the quantity of time units being greater than 1, the first indication information indicates that the first reference signal is associated with the second signal. In response to the quantity of time units being equal to 1, the first indication information indicates that the first reference signal is not associated with the second signal, or the first reference signal is associated with only the first signal.

In at least one embodiment, the first indication information is carried in downlink control information DCI, and the DCI indicates the terminal device to receive the first signal, or the DCI indicates the terminal device to receive the first signal and the second signal.

In this embodiment, operations performed by the units in the terminal device are similar to those described in the embodiment shown in FIG. 5 or FIG. 7. Details are not described herein again.

In this embodiment, the transceiver unit 901 sends the first indication information and the first reference signal to the terminal device, so that the terminal device learns, based on the first indication information, whether the first reference signal is associated with the second signal. In response to the first reference signal being associated with the second signal, the terminal device further stores the first reference signal, and process the second signal by using the first reference signal. In response to the first reference signal not being associated with the second signal, the terminal device does not store the first reference signal. This reduces buffer overheads of the terminal device.

In at least one embodiment, the network device 900 includes:

a transceiver unit 901, configured to send first indication information to a terminal device, where the first indication information indicates whether a second reference signal in a second time period is associated with a first signal in a first time period, a first reference signal is associated with the first signal in the first time period, the second reference signal is associated with a second signal in the second time period, and a start moment of the first time period is after an end moment of the second time period, where the transceiver unit 901 is further configured to send the first reference signal and the first signal to the terminal device.

In at least one embodiment, the first indication information is carried in downlink control information DCI, and the DCI indicates the terminal device to receive the first signal.

In this embodiment, operations performed by the units in the terminal device are similar to those described in the embodiment shown in FIG. 5 or FIG. 7. Details are not described herein again.

In this embodiment, the transceiver unit 901 sends the first indication information to the terminal device, so that the terminal device learns, based on the first indication information, whether the second reference signal is associated with the first signal. In response to the second reference signal being associated with the first signal, the terminal device performs processing by using both the first reference signal and the second reference signal, to obtain a third estimation value, so that channel estimation precision is improved.

Figure 10:
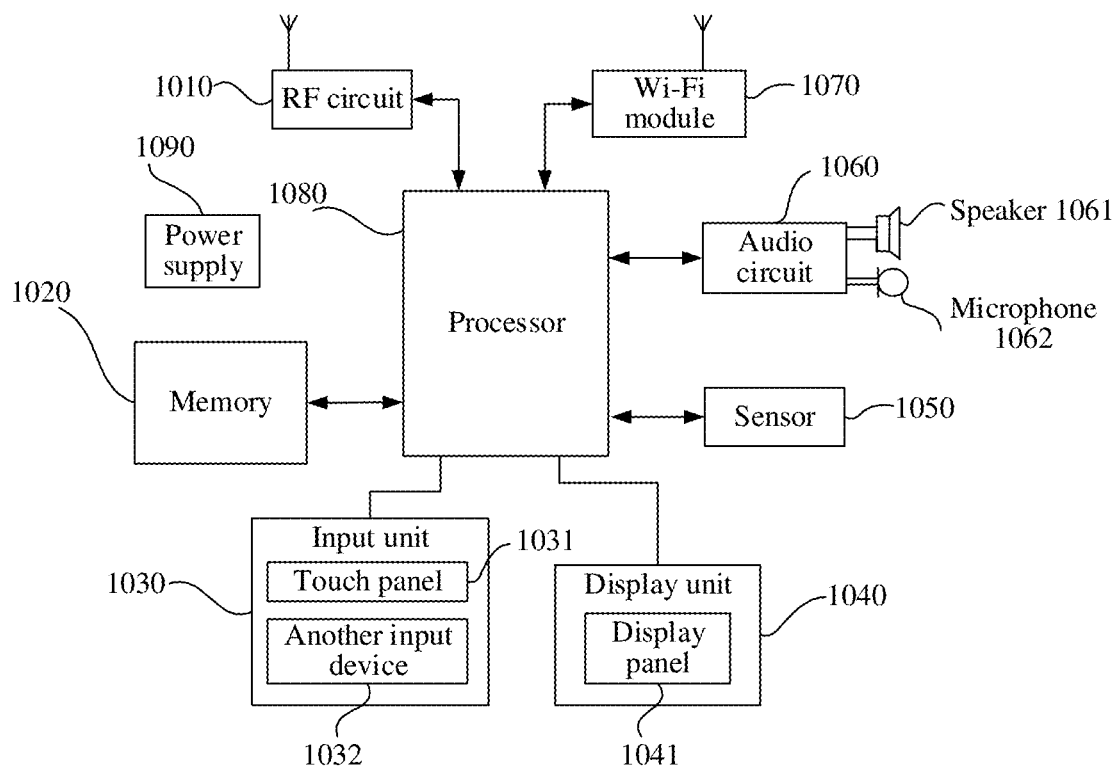
FIG. 10 is a schematic diagram of another structure of a terminal device according to at least one embodiment.

With reference to FIG. 10, an embodiment described herein provides another terminal device. For ease of description, only a part related to at least one embodiment is described. For specific technical details that are not disclosed, refer to the method part in embodiments described herein. The terminal device is any terminal device, for example, a mobile phone, a tablet computer, a personal digital assistant (personal digital assistant, PDA), a point of sales (point of sales, POS), or a vehicle-mounted computer. That the terminal device is a mobile phone is used as an example.

FIG. 10 is a block diagram of a part of a structure of the mobile phone related to the terminal device according to at least one embodiment. With reference to FIG. 10, the mobile phone includes components such as a radio frequency (radio frequency, RF) circuit 1010, a memory 1020, an input unit 1030, a display unit 1040, a sensor 1050, an audio circuit 1060, a wireless fidelity (wireless fidelity, Wi-Fi) module 1070, a processor 1080, and a power supply 1090. A person skilled in the art understands that the structure of the mobile phone shown in FIG. 10 does not constitute any limitation on the mobile phone. The mobile phone includes more or fewer components than those shown in the figure, or combine some components, or have a different component arrangement.

The following describes each component of the mobile phone in detail with reference to FIG. 10.

The RF circuit 1010 is configured to receive and send signals in an information receiving and sending process or a call process. In particular, the RF circuit 1010 receives downlink information from a base station, and then sends the downlink information to the processor 1080 for processing. In addition, the RF circuit 1010 sends designed uplink data to the base station. Usually, the RF circuit 1010 includes but is not limited to an antenna, at least one amplifier, a transceiver, a coupler, a low noise amplifier (low noise amplifier, LNA), a duplexer, and the like. In addition, the RF circuit 1010 further communicates with a network and another device through wireless communication. Any communication standard or protocol is used in the wireless communication, including but not limited to a global system for mobile communications (global system for mobile communications, GSM), a general packet radio service (general packet radio service, GPRS), code division multiple access (code division multiple access, CDMA), wideband code division multiple access (wideband code division multiple access, WCDMA), long term evolution (long term evolution, LTE), an email, a short message service (short message service, SMS), and the like.

The memory 1020 is configured to store a software program and a module. The processor 1080 runs the software program and the module stored in the memory 1020, to perform various function applications of the mobile phone and perform data processing. The memory 1020 includes a program storage area and a data storage area. The program storage area stores an operating system, an application program that is used by at least one function (such as a sound playing function or an image playing function), and the like. The data storage area stores data (such as audio data or a phone book) created during use of the mobile phone, and the like. In addition, the memory 1020 includes a high speed random access memory, and further includes a nonvolatile memory, for example, at least one magnetic disk storage device, a flash memory device, or another volatile solid-state storage device.

The input unit 1030 is configured to receive input digit or character information, and generate a key signal input related to user setting and function control of the mobile phone. Specifically, the input unit 1030 includes a touch panel 1031 and another input device 1032. The touch panel 1031, also referred to as a touchscreen, collects a touch operation performed by a user on or near the touch panel 1031 (for example, an operation performed by the user on or near the touch panel 1031 by using any proper object or accessory such as a finger or a stylus), and drive a corresponding connection apparatus based on a preset program. Optionally, the touch panel 1031 includes two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 1080, and receives and executes a command sent by the processor 1080. In addition, the touch panel 1031 is implemented in a plurality of types, such as a resistive type, a capacitive type, an infrared type, and a surface acoustic wave type. The input unit 1030 includes the another input device 1032 in addition to the touch panel 1031. Specifically, the another input device 1032 includes but is not limited to one or more of a physical keyboard, a function key (for example, a volume control key or an on/off key), a trackball, a mouse, a joystick, and the like.

The display unit 1040 is configured to display information input by the user or information provided for the user, and various menus of the mobile phone. The display unit 1040 includes a display panel 1041. Optionally, the display panel 1041 is configured in a form of a liquid crystal display (liquid crystal display, LCD), an organic light-emitting diode (organic light-emitting diode, OLED), or the like. Further, the touch panel 1031 covers the display panel 1041. After detecting the touch operation on or near the touch panel 1031, the touch panel 1031 transmits the touch operation to the processor 1080 to determine a type of a touch event. Then, the processor 1080 provides a corresponding visual output on the display panel 1041 based on the type of the touch event. In FIG. 10, the touch panel 1031 and the display panel 1041 are used as two independent components to implement input and input functions of the mobile phone. However, in some embodiments, the touch panel 1031 and the display panel 1041 is integrated to implement the input and output functions of the mobile phone.

The mobile phone further includes at least one sensor 1050, for example, an optical sensor, a motion sensor, and another sensor. Specifically, the optical sensor includes an ambient light sensor and a proximity sensor. The ambient light sensor adjusts luminance of the display panel 1041 based on brightness of ambient light. The proximity sensor turns off the display panel 1041 and/or backlight in response to the mobile phone moving near an ear. As one type of the motion sensor, an accelerometer sensor detects a value of acceleration in each direction (usually on three axes), detects a magnitude and a direction of gravity in a stationary state, and is used in an application for identifying a posture of the mobile phone (for example, screen switching between a landscape mode and a portrait mode, a related game, or magnetometer posture calibration), a function related to vibration identification (for example, a pedometer or a knock), or the like. Other sensors such as a gyroscope, a barometer, a hygrometer, a thermometer, or an infrared sensor is further configured in the mobile phone. Details are not described herein.

The audio circuit 1060, a speaker 1061, and a microphone 1062 provides an audio interface between the user and the mobile phone. The audio circuit 1060 converts received audio data into an electrical signal, and transmit the electrical signal to the speaker 1061, and the speaker 1061 converts the electrical signal into a sound signal for output. In addition, the microphone 1062 converts a collected sound signal into an electrical signal. The audio circuit 1060 receives the electrical signal, converts the electrical signal into audio data, and then outputs the audio data to the processor 1080 for processing. The processor 1080 sends the audio data to, for example, another mobile phone through the RF circuit 1010, or outputs the audio data to the memory 1020 for further processing.

Wi-Fi is a short distance wireless transmission technology. The mobile phone helps, through the Wi-Fi module 1070, the user receive and send emails, browse a web page, access streaming media, and the like, to provide wireless broadband internet access for the user. Although FIG. 10 shows the Wi-Fi module 1070, the Wi-Fi module 1070 is not a mandatory component of the mobile phone.

As a control center of the mobile phone, the processor 1080 is connected to various parts of the entire mobile phone by using various interfaces and lines, and performs various functions and data processing of the mobile phone by running or executing a software program and/or a module stored in the memory 1020 and invoking data stored in the memory 1020, to perform integral monitoring on the mobile phone. Optionally, the processor 1080 includes one or more processing units. Preferably, an application processor and a modem processor is integrated into the processor 1080. The application processor mainly processes an operating system, a user interface, an application program, and the like. The modem processor mainly processes wireless communication. The modem processor is alternatively not integrated into the processor 1080.

The mobile phone further includes the power supply 1090 (for example, a battery) that supplies power to all components. Preferably, the power supply is logically connected to the processor 1080 by using a power supply management system, to implement functions such as charging and discharging management and power consumption management by using the power supply management system.

Although not shown in the figure, the mobile phone further includes a camera, a Bluetooth module, and the like, and details are not described herein.

In at least one embodiment, the processor 1080 included in the terminal device performs the functions in the embodiment shown in FIG. 5 or FIG. 7. Details are not described herein again.

Figure 11:
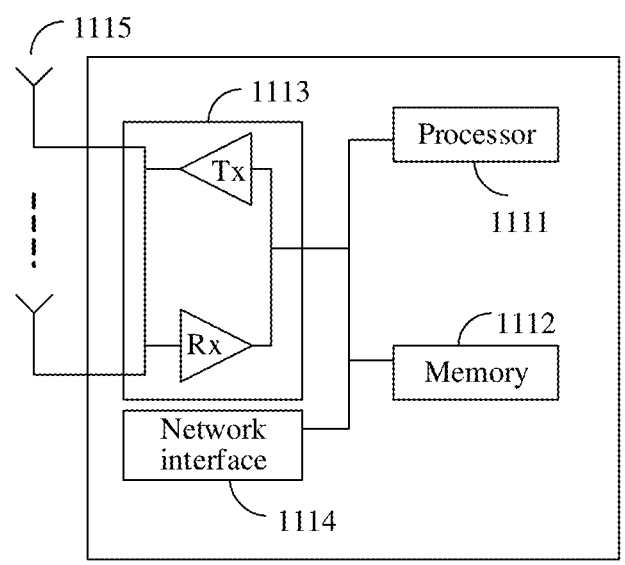
FIG. 11 is a schematic diagram of another structure of a network device according to at least one embodiment.

FIG. 11 is a schematic diagram of a structure of the network device in the foregoing embodiments. For the structure of the network device, refer to the structure shown in FIG. 11.

The network device includes at least one processor 1111, at least one memory 1112, at least one transceiver 1113, at least one network interface 1114, and one or more antennas 1115. The processor 1111, the memory 1112, the transceiver 1113, and the network interface 1114 are connected, for example, connected through a bus. In embodiments described herein, a connection includes various types of interfaces, transmission lines, buses, or the like. This is not limited in embodiments. The antenna 1115 is connected to the transceiver 1113. The network interface 1114 is configured to enable the network device to connect to another communication device through a communication link. For example, the network interface 1114 includes a network interface between the network device and a core network device, for example, an S1 interface; the network interface includes a network interface between the network device and another network device (for example, another access network device or a core network device), for example, an X2 interface or an Xn interface.

The processor 1111 is mainly configured to: process a communication protocol and communication data, control the entire network device, execute a software program, and process data of the software program. For example, the processor 1111 is configured to support the network device in performing actions described in embodiments. The network device includes a baseband processor and a central processing unit. The baseband processor is mainly configured to process the communication protocol and the communication data. The central processing unit is mainly configured to: control the entire terminal device, execute the software program, and process the data of the software program. The processor 1111 in FIG. 11 integrates functions of the baseband processor and the central processing unit. A person skilled in the art understands that the baseband processor and the central processing unit is alternatively processors independent of each other, and are interconnected by using a technology such as a bus. A person skilled in the art understands that the terminal device includes a plurality of baseband processors to adapt to different network standards, the terminal device includes a plurality of central processing units to improve a processing capability of the terminal device, and components of the terminal device is connected through various buses. The baseband processor is also expressed as a baseband processing circuit or a baseband processing chip. The central processing unit is also expressed as a central processing circuit or a central processing chip. A function of processing the communication protocol and the communication data is built in the processor, or is stored in the memory in a form of a software program. The processor executes the software program to implement a baseband processing function.

The memory is mainly configured to store the software program and data. The memory 1112 exists independently, and is connected to the processor 1111. Optionally, the memory 1112 and the processor 1111 is integrated together, for example, integrated in a chip. The memory 1112 stores program code for performing the technical solutions in at least one embodiment, and the processor 1111 controls execution of the program code. Various types of executed computer program code is also considered as drivers of the processor 1111.

FIG. 11 shows only one memory and only one processor. An actual terminal device includes a plurality of processors and a plurality of memories. The memory is also referred to as a storage medium, a storage device, or the like. The memory is a storage element located on a same chip as the processor, that is, an on-chip storage element, or is an independent storage element. This is not limited in embodiments described herein.

The transceiver 1113 is configured to support receiving or sending of a radio frequency signal between the network device and a terminal, and the transceiver 1113 is connected to the antenna 1115. The transceiver 1113 includes a transmitter Tx and a receiver Rx. Specifically, the one or more antennas 1115 receive a radio frequency signal. The receiver Rx of the transceiver 1113 is configured to: receive the radio frequency signal from the antenna, convert the radio frequency signal into a digital baseband signal or a digital intermediate frequency signal, and provide the digital baseband signal or the digital intermediate frequency signal for the processor 1111, so that the processor 1111 further processes the digital baseband signal or the digital intermediate frequency signal, for example, performs demodulation processing and decoding processing. In addition, the transmitter Tx of the transceiver 1113 is further configured to: receive a modulated digital baseband signal or a modulated digital intermediate frequency signal from the processor 1111, convert the modulated digital baseband signal or the modulated digital intermediate frequency signal into a radio frequency signal, and send the radio frequency signal through the one or more antennas 1115. Specifically, the receiver Rx selectively performs one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx selectively performs one or more levels of frequency up-mixing processing and digitalto-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal is collectively referred to as digital signals.

The transceiver is also referred to as a transceiver unit, a transceiver machine, a transceiver apparatus, or the like. Optionally, a component that is configured to implement a receiving function and that is in the transceiver unit is considered as a receiving unit, and a component that is configured to implement a sending function and that is in the transceiver unit is considered as a sending unit. In other words, the transceiver unit includes the receiving unit and the sending unit. The receiving unit is also referred to as a receiving machine, an input port, a receiving circuit, or the like, and the sending unit is referred to as a transmitting machine, a transmitter, a transmitting circuit, or the like.

The network device shown in FIG. 11 is specifically configured to implement the steps implemented by the network device in the method embodiment corresponding to FIG. 5 or FIG. 7, and implement technical effects corresponding to the network device. Details are not described herein again.

At least one embodiment further provides a computer-readable storage medium storing one or more computer-executable instructions. In response to the computer-executable instructions being executed by a processor, the processor performs the method performed by the terminal device in at least one embodiment. The terminal device is specifically the terminal device in the method embodiment corresponding to FIG. 5 or FIG. 7.

At least one embodiment further provides a computer-readable storage medium storing one or more computer-executable instructions. In response to the computer-executable instructions being executed by a processor, the processor performs the method performed by the network device in at least one embodiment. The network device is specifically the network device in the method embodiment corresponding to FIG. 5 or FIG. 7.

At least one embodiment further provides a computer program product (or referred to as a computer program) storing one or more computers. In response to the computer program product being executed by a processor, the processor performs the method performed by the terminal device in at least one embodiment. The terminal device is specifically the terminal device in the method embodiment corresponding to FIG. 5 or FIG. 7.

At least one embodiment further provides a computer program product storing one or more computers. In response to the computer program product being executed by a processor, the processor performs the method performed by the network device in at least one embodiment. The network device is specifically the network device in the method embodiment corresponding to FIG. 5 or FIG. 7.

At least one embodiment further provides a chip system. The chip system includes a processor, configured to support a terminal device in implementing functions performed by the terminal device in at least one embodiment. In at least one embodiment, the chip system further includes a memory, and the memory is configured to store program instructions and data that are necessary for the terminal device. The chip system includes a chip, or includes a chip and another discrete component. The terminal device is specifically the terminal device in the method embodiment corresponding to FIG. 5 or FIG. 7.

At least one embodiment further provides a chip system. The chip system includes a processor, configured to support a network device in implementing functions performed by the network device in at least one embodiment. In at least one embodiment, the chip system further includes a memory, and the memory is configured to store program instructions and data that are necessary for the network device. The chip system includes a chip, or includes a chip and another discrete component. The network device is specifically the terminal device in the method embodiment corresponding to FIG. 5 or FIG. 7.

At least one embodiment further provides a network system architecture. The network system architecture includes the terminal device and/or the network device in the foregoing embodiment, that is, the terminal device and the network device in the method embodiment corresponding to FIG. 5 or FIG. 7.

In several embodiments described herein, the disclosed system, apparatus, and method is implemented in other manners. For example, the described apparatus embodiments are merely examples. For example, division into the units is merely logical function division, and is other division during actual implementation. For example, a plurality of units or components is combined or integrated into another system, or some features is ignored or not performed. In addition, the displayed or discussed mutual couplings or direct couplings or communication connections is implemented through some interfaces. The indirect couplings or communication connections between the apparatuses or units is implemented in electrical, mechanical, or other forms.

The units described as separate parts may or is not physically separate, and parts displayed as units may or is not physical units, that is, is located in one position, or is distributed on a plurality of network units. Some or all of the units is selected based on actual requirements to achieve the objectives of the solutions of embodiments.

In addition, functional units in at least one embodiment is integrated into one processing unit, or each of the units exist alone physically, or two or more units is integrated into one unit. The integrated unit is implemented in a form of hardware, or is implemented in a form of a software functional unit.

In response to the integrated unit being implemented in the form of a software functional unit and sold or used as an independent product, the integrated unit is stored in a computer-readable storage medium. Based on such an understanding, the technical solutions of at least one embodiment, or the part contributing to the current technology, or all or some of the technical solutions are implemented in a form of a software product. The computer software product is stored in a storage medium and includes several instructions for instructing a computer device (which is a personal computer, a server, a network device, or the like) to perform all or some of the steps of the methods described in at least one embodiment. The foregoing storage medium includes any medium that stores program code, for example, a USB flash drive, a removable hard disk, a read-only memory (read-only memory, ROM), a random access memory (random access memory, RAM), a magnetic disk, or an optical disc.

What is claimed is:

1. A signal processing method, comprising:
receiving first indication information from a network device, wherein the first indication information is useable to indicate whether a first reference signal in a first time period is associated with a second signal in a second time period, the first reference signal is associated with a first signal in the first time period, and a start moment of the second time period is after an end moment of the first time period;

receiving the first reference signal from the network device;

receiving from the network device the first signal in the first time period based on the first indication information;

processing the first signal using the first reference signal;

receiving the second signal; and based on the first reference signal in the first time period being associated with the second signal in the second time period, processing the second signal based on the first indication information.

2. The method according to claim 1, wherein the processing the second signal based on the first indication information includes:

demodulating the second signal based on the first reference signal in response to determining, based on the first indication information, that the first reference signal is associated with the second signal; and/or demodulating the second signal based on a second reference signal in response to determining, based on the first indication information, that the first reference signal is not associated with the second signal, wherein the second reference signal is associated with the second signal in the second time period.

3. The method according to claim 2, wherein the method further comprises:

in response to determining, based on the first indication information, that the first reference signal is associated with the second signal, storing the first reference signal or a first estimator determined based on the first reference signal; and the demodulating the second signal based on the first reference signal includes:

demodulating the second signal based on the first reference signal or the first estimator.

4. The method according to claim 3, wherein the first estimator includes any one of the following:

a frequency domain signal of the first reference signal, a channel estimation value of a symbol on which the first reference signal is located, the channel estimation value of the symbol on which the first reference signal is located and a channel estimation value of a symbol on which the first signal is located, a channel estimation value of a last symbol carrying the first signal, or a combined value of the channel estimation value of the symbol on which the first reference signal is located and channel estimation values of all or some symbols carrying the first signal.

5. The method according to claim 1, wherein that the first indication information is useable to indicate whether the first reference signal in the first time period is associated with the second signal in the second time period includes:

the first indication information indicates a quantity of time units associated with the first reference signal; and in response to the quantity of time units being greater than 1, the first indication information is useable to indicate that the first reference signal is associated with the second signal; or in response to the quantity of time units being equal to 1, the first indication information is useable to indicate that the first reference signal is not associated with the second signal, or the first reference signal is associated with only the first signal.

6. The method according to claim 1, wherein the first indication information is carried in downlink control information (DCI), and the DCI is useable to indicate a terminal device receives the first signal, or the DCI is useable to indicate the terminal device receives the first signal and the second signal.

7. A signal processing method, comprising:

sending first indication information to a terminal device, wherein the first indication information is useable to indicate whether a first reference signal in a first time period is associated with a second signal in a second time period, the first reference signal is associated with a first signal in the first time period, and a start moment of the second time period is after an end moment of the first time period;

sending the first reference signal to the terminal device;

sending the first signal in the first time period based on the first indication information, the first reference signal usable for processing the first signal; and sending the second signal, the first indication information being usable to process the second signal based on the first reference signal in the first time period being associated with the second signal in the second time period.

8. The method according to claim 7, wherein that the first indication information is useable to indicate whether the first reference signal in the first time period is associated with the second signal in a second time period includes:

the first indication information is useable to indicate a quantity of time units associated with the first reference signal in the first time period; and in response to the quantity of time units being greater than 1, the first indication information is useable to indicate that the first reference signal is associated with the second signal; or in response to the quantity of time units being equal to 1, the first indication information is useable to indicate that the first reference signal is not associated with the second signal, or the first reference signal is associated with only the first signal.

9. The method according to claim 7, wherein the first indication information is carried in downlink control information (DCI), and the DCI is useable to indicate the terminal device receives the first signal, or the DCI is useable to indicate the terminal device receives the first signal and the second signal.

10. A signal processing apparatus, comprising:

one or more memories coupled to the at least one processor and storing programming instructions; and at least one processor connected to the one or more memories, wherein the at least one processor is configured to execute the programming instructions to perform operations to:

receive first indication information from a network device, wherein the first indication information is useable to indicate whether a first reference signal in a first time period is associated with a second signal in a second time period, the first reference signal is associated with a first signal in the first time period, and a start moment of the second time period is after an end moment of the first time period;

receive the first reference signal from the network device;

receive from the network device the first signal in the first time period based on the first indication information;

process the first signal using the first reference signal;

receive the second signal; and based on the first reference signal in the first time period being associated with the second signal in the second time period, process the second signal based on the first indication information.

11. The signal processing apparatus according to claim 10, wherein the at least one processor is further configured to:
demodulate the second signal based on the first reference signal in response to determining, based on the first indication information, that the first reference signal is associated with the second signal; and/or
demodulate the second signal based on a second reference signal in response to determining, based on the first indication information, that the first reference signal is not associated with the second signal, wherein the second reference signal is associated with the second signal in the second time period.

12. The signal processing apparatus according to claim 11, wherein the at least one processor is further configured to:
in response to determining, based on the first indication information, that the first reference signal is associated with the second signal, store the first reference signal or a first estimator determined based on the first reference signal; and
demodulate the second signal based on the first reference signal or the first estimator.

13. The signal processing apparatus according to claim 12, wherein the first estimator includes any one of the following:
a frequency domain signal of the first reference signal, a channel estimation value of a symbol on which the first reference signal is located, the channel estimation value of the symbol on which the first reference signal is located and a channel estimation value of a symbol on which the first signal is located, a channel estimation value of a last symbol carrying the first signal, and a combined value of the channel estimation value of the symbol on which the first reference signal is located and channel estimation values of all or some symbols carrying the first signal.

14. The signal processing apparatus according to claim 10, wherein:
the first indication information is further useable to indicate a quantity of time units associated with the first reference signal; and
in response to the quantity of time units being greater than 1, the first indication information is useable to indicate that the first reference signal is associated with the second signal; or
in response to the quantity of time units being equal to 1, the first indication information is useable to indicate that the first reference signal is not associated with the second signal, or the first reference signal is associated with only the first signal.

15. The signal processing apparatus according to claim 10, wherein the at least one processor is further configured to carry the first indication information in downlink control information (DCI), and the DCI is useable to indicate a terminal device receives the first signal, or the DCI is useable to indicate the terminal device receives the first signal and the second signal.

16. A signal processing apparatus, comprising:
one or more memories coupled to the at least one processor and storing programming instructions; and
at least one processor connected to the one or more memories, wherein the at least one processor is configured to execute the programming instructions to perform operations to:
send first indication information to a terminal device, wherein the first indication information is useable to indicate whether a first reference signal in a first time period is associated with a second signal in a second time period, the first reference signal is associated with a first signal in the first time period, and a start moment of the second time period is after an end moment of the first time period;
send the first reference signal to the terminal device;
send the first signal in the first time period based on the first indication information, the first reference signal usable for processing the first signal; and
send the second signal, the first indication information being usable to process the second signal based on the first reference signal in the first time period being associated with the second signal in the second time period.

17. The signal processing apparatus according to claim 16, wherein: the first indication information is further useable to indicate a quantity of time units associated with the first reference signal in the first time period; and
in response to the quantity of time units being greater than 1, the first indication information is useable to indicate that the first reference signal is associated with the second signal; or
in response to the quantity of time units being equal to 1, the first indication information is useable to indicate that the first reference signal is not associated with the second signal, or the first reference signal is associated with only the first signal.

18. The signal processing apparatus according to claim 16, wherein the at least one processor is further configured to
carry the first indication information in downlink control information (DCI), and the DCI is useable to indicate the terminal device receives the first signal, or the DCI is useable to indicate the terminal device receives the first signal and the second signal.

* * * * *